United States Patent [19]

Jiang et al.

[11] Patent Number: 5,886,891
[45] Date of Patent: Mar. 23, 1999

[54] THREE-PHASE BOOST CONVERTER HAVING WYE-CONNECTED INPUT CAPACITORS AND METHOD OF OPERATION THEREOF

[75] Inventors: Yimin Jiang; Hengchun Mao, both of Plano, Tex.

[73] Assignee: Lucent Technologies Inc., Murray Hill, N.J.

[21] Appl. No.: 118,550

[22] Filed: Jul. 17, 1998

[51] Int. Cl.$^6$ ........................................ H02M 1/12

[52] U.S. Cl. .......................... 363/84; 363/89; 323/225

[58] Field of Search ............................ 363/34, 37, 39, 363/40, 44, 45, 52, 55, 56, 84, 89, 124, 125, 126; 323/222, 225, 226

[56] References Cited

U.S. PATENT DOCUMENTS

| 5,345,375 | 9/1994 | Mohan | 363/40 |
| 5,414,613 | 5/1995 | Chen | 363/52 |

OTHER PUBLICATIONS

Da Feng Weng, S. Yuvarajan, "Resonant Boost Input Three Phase Power Factor Corrector," 1998 IEEE, pp. 958–962.

*Primary Examiner*—Peter S. Wong
*Assistant Examiner*—Y. J. Han

[57] ABSTRACT

A three-phase boost converter having wye-connected input capacitors and a method of operating the same. The boost converter includes first, second and third phase inputs and an output. In one embodiment, the boost converter includes first, second and third inductors coupled to the first, second and third phase inputs, respectively, and operable in a discontinuous conduction mode (DCM). The boost converter further includes first and second switches coupled between corresponding rails of the output. The boost converter still further includes first, second and third capacitors coupled between the first, second and third phase inputs, respectively, and a node between the first and second switches. The first and second switches cooperate progressively to employ a voltage across the rails less a voltage across the first, second and third capacitors to discharge currents through the first, second and third inductors, respectively, and thereby reduce input current THD on all three of the phase inputs.

20 Claims, 5 Drawing Sheets

THREE-PHASE BOOST CONVERTER HAVING WYE-CONNECTED INPUT CAPACITORS AND METHOD OF OPERATION THEREOF

TECHNICAL FIELD OF THE INVENTION

The present invention is directed, in general, to power conversion and, more specifically, to a three-phase boost converter having wye-connected input capacitors and method of operating the same.

BACKGROUND OF THE INVENTION

Regulated DC power supplies are typically employed in analog and digital electronic systems. Two major categories of regulated DC power supplies are linear power supplies and switching power supplies. For reasons that will become more apparent, switching power supplies are generally the power supply of choice. In switching power supplies, transformation of a DC voltage from one level to another is often accomplished with a DC/DC converter, such as a step-down (buck) or step-up (boost) converter. Solid state devices, such as transistors, are operated as switches (either completely ON or completely OFF) within the switching converters. Since the power devices do not operate in the active region (as dictated in linear power supplies), the switching power supplies can achieve lower power dissipation in comparison to linear power supplies. Furthermore, the higher switching speeds and voltage and current ratings of the presently available power devices have further expanded the popularity of switching power supplies.

For applications that require three-phase off-line rectification with low input current total harmonic distortion (THD), the simplest switching power converter topology is a single switch discontinuous current mode (DCM) boost converter. By operating the input inductors of the boost converter in DCM, at the beginning of each switching cycle, i.e., when the boost switch is ON, currents through the input inductors begin to ramp up from an initial value of zero at a rate proportional to the corresponding phase-to-neutral voltage of the input inductors. Consequently, the average input inductor currents, which are also the phase currents, are naturally proportional to the corresponding phase voltages when the boost switch is ON.

When the boost switch is OFF, an output voltage which is higher than the peak of the input phase-to-phase voltage (due to the operation of the boost converter) drives the currents through the input inductors to zero prior to the initiation of the next switching cycle. The rate of decrease of the current through each input inductor, however, is not proportional to the corresponding input phase-to-neutral voltage due to the participation of the output voltage. Thus, when the boost switch is OFF, the average input inductor currents, in this period, are not proportional to the corresponding phase-to-neutral voltages of the input inductors resulting in distortions in the input phase currents. It should be noted that for higher output voltages, the currents through the input inductors decrease at a faster rate thereby reducing distortions in the input currents.

Studies have shown that to achieve an input current THD of less than 10%, for instance, the output voltage of the boost converter should be about 1.7 times greater than the input phase-to-phase peak voltage (M>1.7; where M=Vout/Vin (peak)) of the boost converter. The high output voltage requirement to attain a low input current THD normally results in an output voltage that is higher than what is generally desired. For example, for an input voltage of 208 volts rms and, taking into account the presence of input voltage fluctuations, the output voltage should be about 650 volts (significantly higher than a conventional 400 volt output) to realize an input current THD of less than 10%. For an input voltage of 440 volts rms, the output voltage should then be as high as 1300 volts (far above a conventional 800 volt output) to achieve the desired input current THD.

Accordingly, what is needed in the art is an improved power converter that overcomes the above described limitations. More specifically, what is needed in the art is a power converter that can achieve a low input current THD and, at the same time, maintain the output voltage of the converter within a preferable range.

SUMMARY OF THE INVENTION

To address the above-discussed deficiencies of the prior art, the present invention provides a three-phase boost converter having wye-connected input capacitors and a method of operating the same. The boost converter includes first, second and third phase inputs and an output.

In one embodiment, the boost converter includes first, second and third inductors coupled to the first, second and third phase inputs, respectively, and operable in a discontinuous conduction mode (DCM). The boost converter further includes first and second switches coupled between corresponding rails of the output. The boost converter still further includes first, second and third capacitors coupled between the first, second and third phase inputs, respectively, and a node between the first and second switches. The first and second switches cooperate progressively to employ a voltage across the rails less a voltage across the first, second and third capacitors to discharge currents through the first, second and third inductors, respectively, and thereby reduce input current total harmonic distortion (THD) on all three of the phase inputs.

The boost converter therefore employs a substantial portion of the voltage across the rails, i.e., the output voltage, to increase a discharge rate of the inductor. Consequently and in accordance with other aspects of the present invention, the boost converter achieves a lower input current THD. For the purposes of the present invention, the phrase "progressively" relates to employing a voltage across the rails less a voltage across the first, second and third capacitors to discharge currents through the first, second and third inductors, respectively. More specifically, the voltage across the rails is applied to the inductors progressively rather than at the same time. The pattern of progression, however, may vary depending on the application for the boost converter.

For instance, assuming that the voltage in the first phase is positive and the voltage in the second and third phases are negative, when the first switch conducts, the current through the first inductor rises in proportion to the voltage across the first capacitor. At the same time, the current in the second and third inductors is discharged by applying a substantial portion of the output voltage across the second and third inductors. In an alternative switching cycle, when the second switch conducts, a substantial portion of the output voltage is applied to the first inductor to discharge the current previously stored therein. At the same time, the current through the second and third inductors increases negatively and will be discharged during the subsequent switching cycle. Thus, in the illustrated progression, the second and third inductors are charged and discharged at the same time and the first inductor is charged and discharged at a different time over the entire switching period. Therefore, a substantial portion of the output voltage participates in discharging the inductors, thereby reducing input current THD for all three-phase inputs of the boost converter.

In one embodiment of the present invention, the converter further includes an output capacitor coupled across the first and second switches. The output capacitor filters a DC waveform at the converter output. Those skilled in the art are familiar with such filters.

In one embodiment of the present invention, the first and second switches each conduct for a duty cycle of about 50%. The duty cycle relates to the conduction period of the respective switches. In the present embodiment, the switches are controlled complementarily, with the first switch turned on for about 50% of a switching cycle and the second switch turned on during at least a substantial portion of the remaining switching cycle. The broad scope of the present invention, however, is not limited to a particular conduction interval for the switches. Also, the switches may have overlapping conduction periods, depending on the particular embodiment of the present invention and application therefor.

In one embodiment of the present invention, the converter input is coupled to an electromagnetic interference (EMI) filter. Those skilled in the art are familiar with EMI filters and the advantages associated therewith. The broad scope of the present invention does not require an EMI filter, however.

In one embodiment of the present invention, the circuit further includes a diode coupled to the output. The diode is adapted to extend the duty cycle of the switches, thereby enhancing the operating range of the converter. In an alternative embodiment, a plurality of diodes interposed between the first, second and third inductors and the first and second switches may be employed to fulfill the same task.

In one embodiment of the present invention, the boost converter includes a rectifier interposed between the first, second and third inductors and the first and second switches. The rectifier may be a passive or active network. In an alternative embodiment, the boost converter is coupled to a regulation circuit that controls the first and second switches. The regulation circuit may include a pulse-width modulation (PWM) circuit. Those skilled in the art are familiar with rectifier and regulation circuits.

In one embodiment of the present invention, a common terminal of the first, second and third capacitors are coupled to the node. In a related, but alternative embodiment, the common terminal of the first, second and third capacitors are also coupled to a neutral potential.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
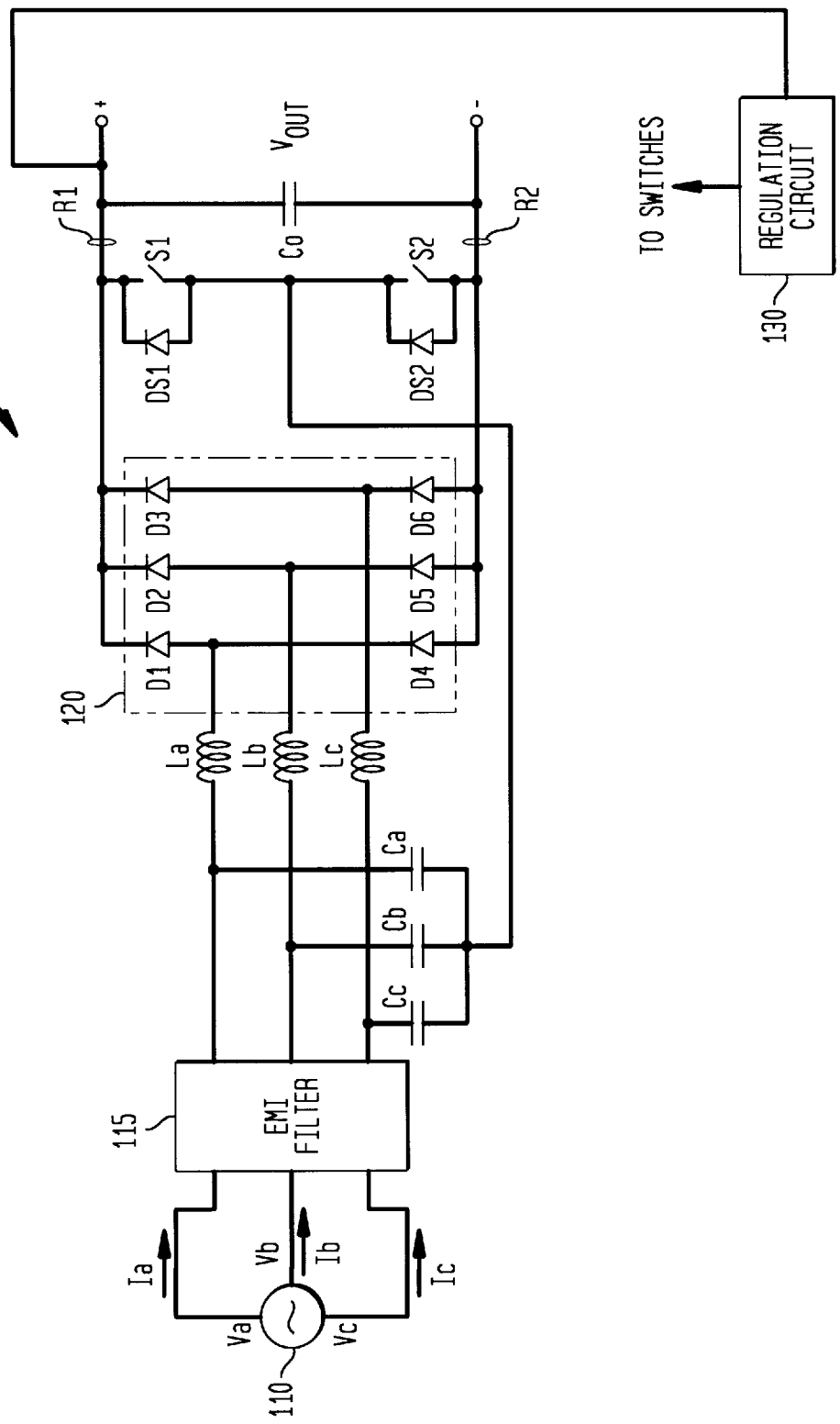
FIG. 1 illustrates a schematic diagram of an embodiment of a three-phase boost converter constructed according to the principles of the present invention.

Referring initially to FIG. 1, illustrated is a schematic diagram of an embodiment of a three-phase boost converter 100 constructed according to the principles of the present invention. The boost converter 100 receives input power from a three-phase voltage source 110 (via an EMI filter 115) through first, second and third boost inductors La, Lb, Lc that are coupled to a rectifier 120 which includes a plurality of diodes D1–D6 arranged in a full bridge configuration. The first, second and third boost inductors La, Lb, Lc are analogous to boost inductors used in a conventional DCM boost converter design and should be small enough to allow the boost converter 100 to operate under DCM over the entire designed operating region. Those skilled in the art should readily appreciate that, in other advantageous embodiments, controllable switches may be used in place of the diodes D1–D6 in the rectifier 120.

The rectifier 120 rectifies the three-phase input voltage into a DC voltage for application to first and second boost switches S1, S2 (located between first and second rails R1, R2, respectively, of an output of the boost converter 100), which allows the use of unidirectional switches to control all three-phase currents Ia, Ib, Ic. Also shown in the illustrated embodiment are first and second antiparallel diodes Ds1, Ds2 that are coupled across the first and second boost switches S1, S2, respectively. The boost switches S1, S2, in an advantageous embodiment, are metal-oxide-semiconductors field effect transistors (MOSFETS) with their corresponding internal body diodes, i.e., first and second antiparallel diodes Ds1, Ds2. In another embodiment, other switching devices, such as insulated gate bipolar transistors (IGBTs), may also be advantageously employed. The first and second boost switches S1, S2, in an advantageous embodiment, are operated complementarily with duty cycles of about 50%. It should be noted that the duty cycles of the boost switches S1, S2 may be varied to control the input power level. Additionally, the switching frequency of the boost switches S1, S2 may be varied to control the input power level.

A regulation circuit 130 senses an output voltage Vout of the boost converter 100 and provides gate drive signals to the first and second boost switches S1, S2. In an advantageous embodiment, the regulation circuit 130 includes a PWM controller. Those skilled in the art are familiar with the construction and operation of PWM controllers; thus, they will not hereinafter be described in detail. Also shown in the illustrated embodiment are first, second and third input capacitors Ca, Cb, Cc that are coupled in a wye (Y) configuration with the first, second and third boost inductors La, Lb, Lc between an input of the boost converter 100 and a node X between the first and second boost switches S1, S2. The first, second and third Y-connected input capacitors Ca, Cb, Cc should be large enough so that the respective voltages hold steady over a switching cycle, yet small enough not to carry large low frequency currents. An output capacitor Co is also shown coupled across the first and second boost switches S1, S2 to filter the output DC waveform. The operation of the boost converter 100 will hereinafter be explained in greater detail.

Figure 2:
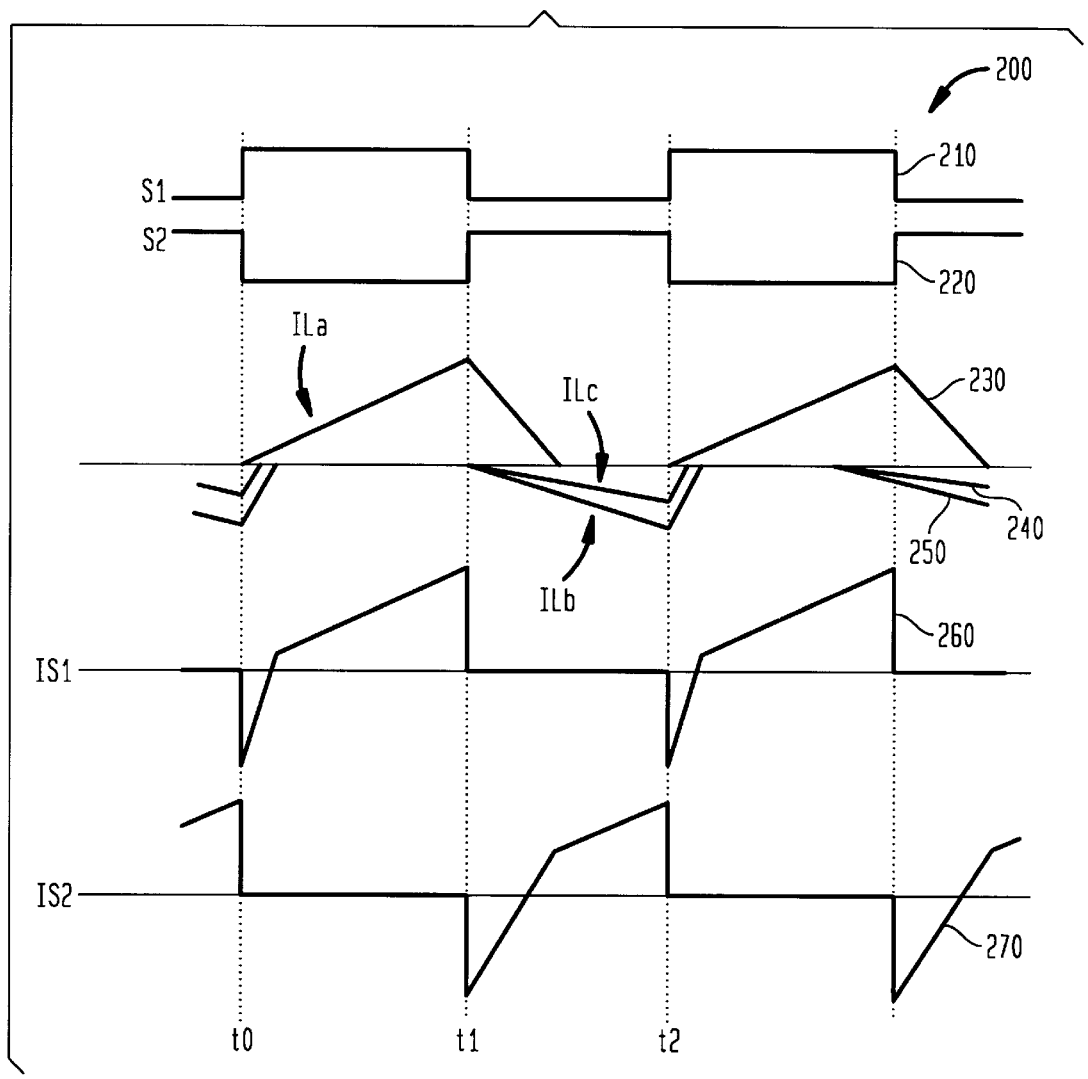
FIG. 2 illustrates drive signals and current waveforms of the boost converter illustrated in FIG. 1.

Turning now to FIG. 2, illustrated are drive signals and current waveforms of the boost converter 100 illustrated in FIG. 1. The waveforms include first and second drive signals 210, 220 of the first and second boost switches S1, S2, respectively. The waveforms also include first, second and third current waveforms 230, 240, 250 corresponding to inductor currents ILa, ILb, ILc in the first, second and third boost inductors La, Lb, Lc, respectively. The waveforms further include fourth and fifth current waveforms 260, 270 through the first and second boost switches S1, S2, respectively, over a switching cycle.

As the operation of the boost converter 100 over a switching cycle is described in greater detail below, the following assumptions and conditions apply (of course, the assumptions and conditions are not necessary to the operation of the boost converter 100).

(1) All of the capacitors except the output capacitor Co are relatively high frequency capacitors, i.e., the average current through each capacitor over a switching cycle is sufficiently small compared to the high frequency operating current for its voltage to stay in its designed operating region. Thus, the low frequency components of the respective currents are relatively small.

(2) All of the boost inductors are relatively high frequency inductors, i.e., the average volts-second applied on each boost inductor over a switching cycle is close to zero. Thus, the boost inductors do not carry low frequency voltages.

(3) A first phase voltage Va and first phase current Ia are greater than zero, or positive. Second and third phase voltages Vb, Vc and second and third phase currents Ib, Ic are negative.

(4) The inductor currents ILa, ILb, ILc are in DCM.

At a time t0, the second boost switch S2 is turned OFF, i.e., not conducting, and the first boost switch S1 is turned ON, i.e., conducting. The current ILa in the first boost inductor La begins to ramp up from an initial value of zero with a slope that is proportional to a voltage across the first input capacitor Ca, which is close to the corresponding phase-to-neutral voltage Va. At the same time, the second and third boost inductors Lb, Lc encounter the full output voltage Vout minus a voltage across the corresponding input capacitors, i.e., a voltage across the second and third input capacitors Cb, Cc, respectively. The currents ILb, ILc in the second and third boost inductors Lb, Lc, beginning at their negative peak value, reduce in amplitude linearly until they reach zero (illustrated by the second and third current waveforms 240, 250).

At a time t1, the first boost switch is turned OFF and the second boost switch is turned ON. Also at time t1, the current ILa in the first boost inductor La (see the first current waveform 230) is at its positive peak value and begins to encounter a reversed voltage equal to the difference between the output voltage Vout and the voltage across the first input capacitor Ca. The voltage drives the current ILa in the first boost inductor La linearly down to zero. At the same time, the currents ILb, ILc through the second and third boost inductors Lb, Lc rise (negatively) from an initial value of zero to the negative peak values in proportion to the voltages across the second and third input capacitors Cb, Cc at time t2. Therefore, the peak of the first, second and third inductor currents ILa, ILb, ILc through the first, second and third boost inductors La, Lb, Lc, respectively, (see the corresponding current waveforms 230, 240, 250) are substantially proportional to the voltage across the corresponding input capacitors Ca, Cb, Cc, which are, in turn, close to the respective phase-to-neutral voltages Va, Vb, Vc.

As previously discussed, the first, second and third boost inductors La, Lb, Lc are charged in proportion to the voltages across the corresponding capacitors Ca, Cb, Cc, which are close to the respective phase-to-neutral voltages Va, Vb, Vc. Therefore, the currents ILa, ILb, ILc in the boost inductors La, Lb, Lc during the charging periods are roughly proportional to the boost inductors corresponding phase-to-neutral voltages, the same as with a conventional single-switch DCM three-phase boost converter. The first, second and third boost inductors La, Lb, Lc, however, are not charged and discharged at the same time, which is the case in the conventional single-switch DCM three-phase boost converter. Instead, the charging and discharging of the boost inductors are interleaved in time. For example, when the boost inductor with the highest phase-to-neutral voltage amplitude is in its charging period, the other two boost inductors are in their discharging periods, including the periods of zero currents. The interleaved charging and discharging allows the discharging voltage, i.e., the difference between the output voltage Vout and the corresponding input capacitor, to be significantly higher than what would be found in a conventional single-switch DCM three-phase boost converter. More specifically, the full output voltage Vout always participates in the discharging of each boost inductor.

In a conventional single-switch DCM three-phase boost converter, on the other hand, during the boost inductors' discharging period, the output voltage Vout is shared by all the boost inductors, i.e., the boost inductors do not see the full output voltage Vout for the full discharging period. Consequently, the discharging voltage applied to each boost inductor in a conventional single-switch DCM boost converter is significantly smaller than the discharging voltage applied to the individual boost inductors in the boost converter 100. With the full output voltage Vout always participating in the discharging of the individual boost inductors, the boost converter 100 requires a significantly lower output voltage Vout to achieve lower THD input currents.

Figure 3:
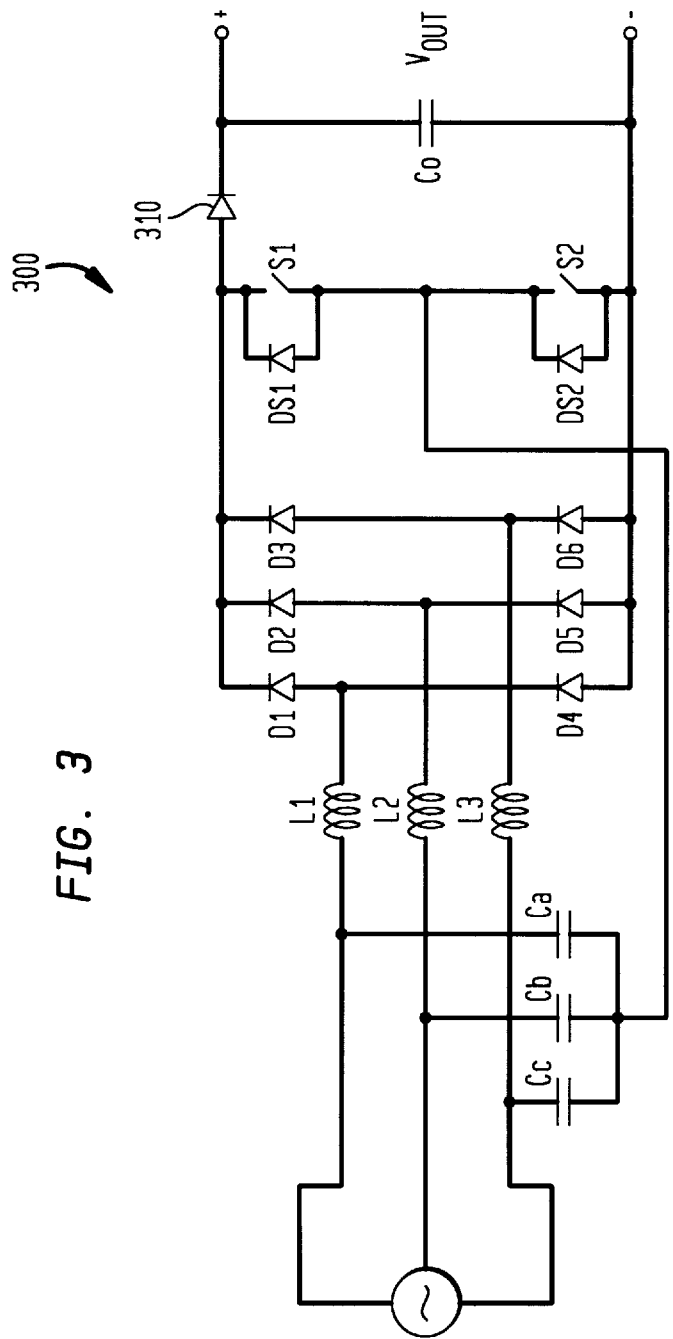
FIG. 3 illustrates a schematic diagram of another embodiment of a three-phase boost converter constructed according to the principles of the present invention.

Turning now to FIG. 3, illustrated is a schematic diagram of another embodiment of a three-phase boost converter 300 constructed according to the principles of the present invention. The boost converter 300 is similar to the boost converter 100 illustrated in FIG. 1, except for the addition of a boost diode 310 coupled between a first boost switch S1 and an output capacitor Co. The boost diode 310 allows the duty cycles of the first and second boost switches S1, S2 to be extended above 50%, thereby providing greater flexibility in the design and implementation of the switching control scheme. Additionally, the boost diode 310 increases the reliability of the boost converter 300 by eliminating the possibility of shoot-through damages when both the first and second boost switches S1, S2 are ON simultaneously.

Figure 4:
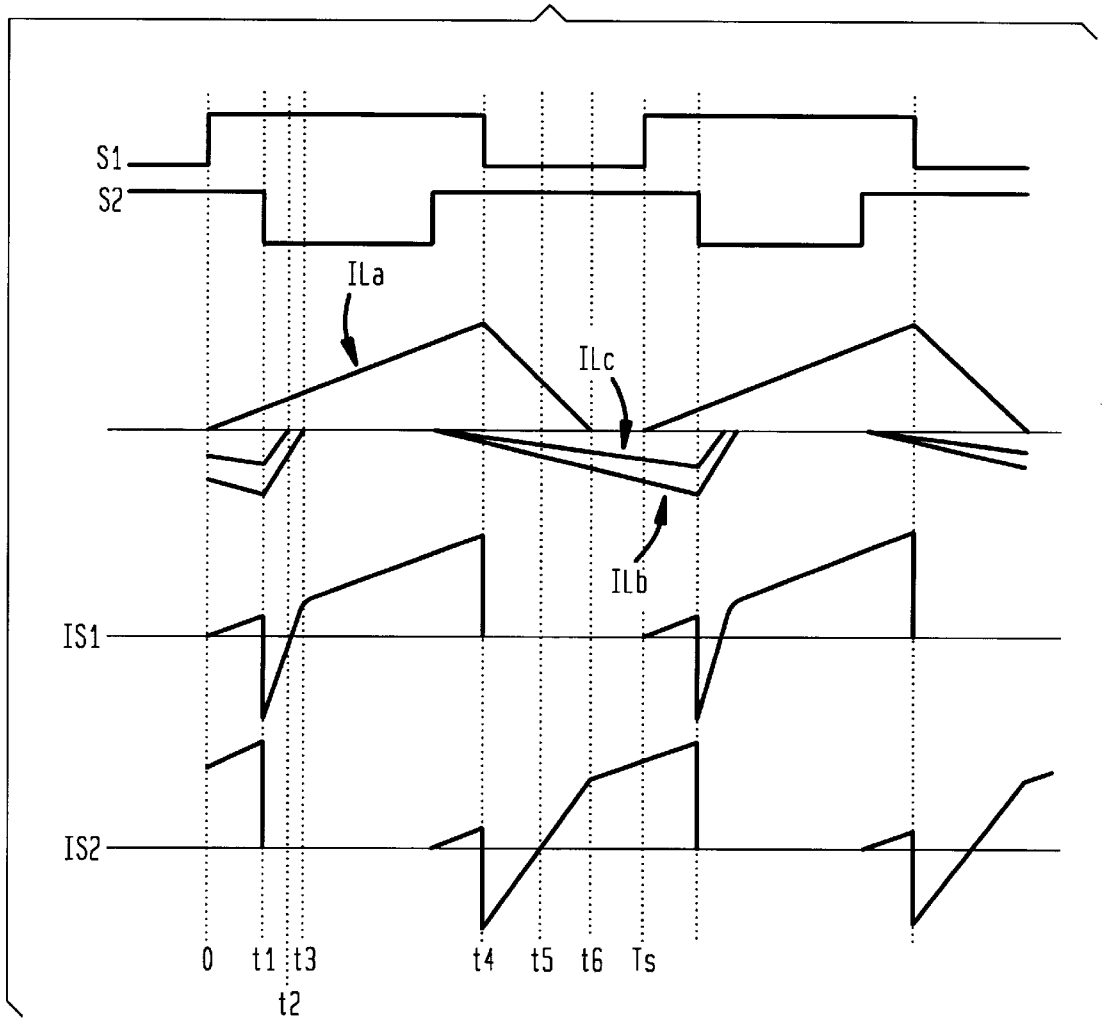
FIG. 4 illustrates drive signals and current waveforms of the boost converter illustrated in FIG. 3.

Exemplary drive signals and current waveforms of the boost converter 300 are illustrated in FIG. 4. The drive signals and current waveforms are analogous to those shown in FIG. 2 except that the duty cycles of the first and second switches S1, S2 are greater than 50%.

Figure 5:
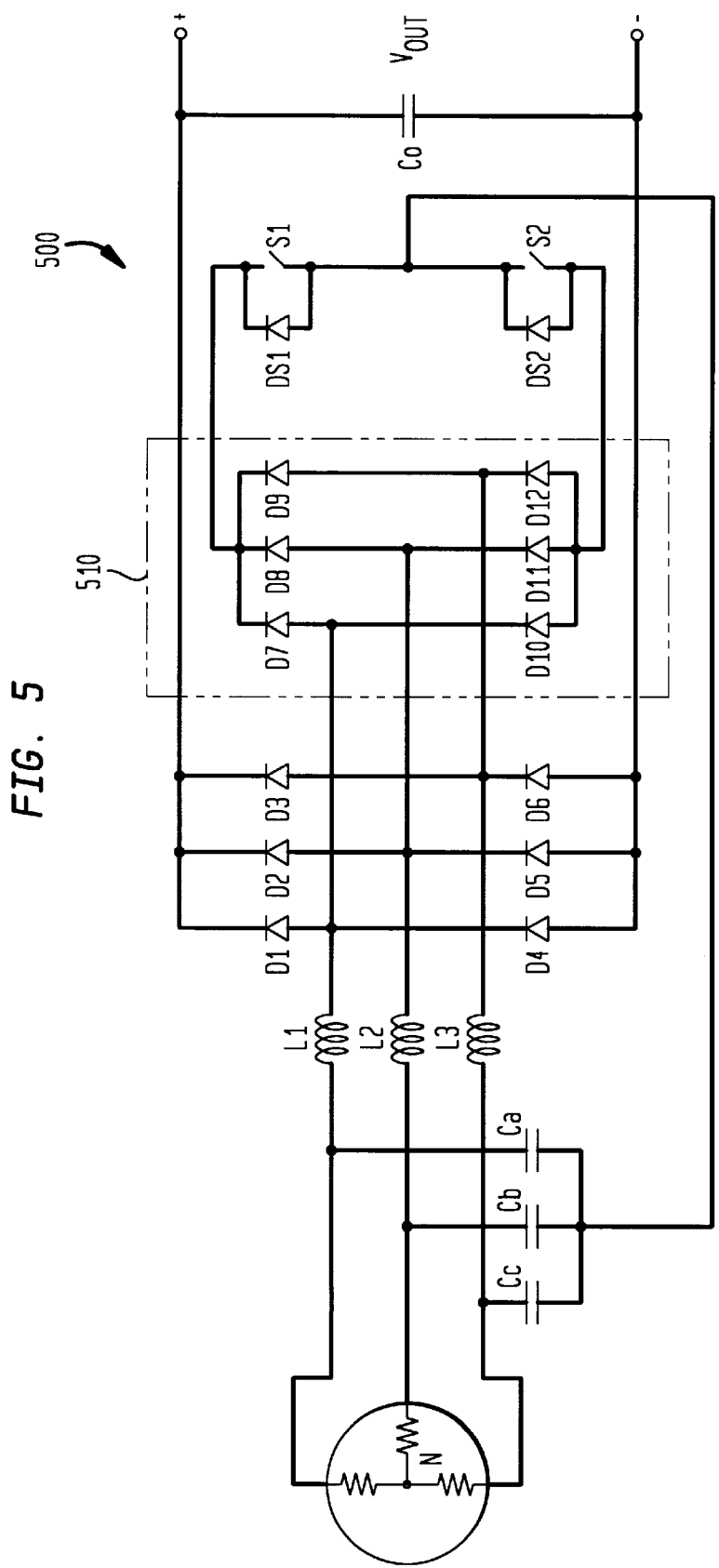
FIG. 5 illustrates a schematic diagram of another embodiment of a three-phase boost converter with a diode block constructed according to the principles of the present invention.

Turning now to FIG. 5, illustrated is a schematic diagram of another embodiment of a three-phase boost converter 500 with a diode block 510 constructed according to the principles of the present invention. The boost converter 500 has the same advantageous features as disclosed in the boost converter 300 illustrated in FIG. 3, namely, shoot-through protection and switch duty cycles of greater than 50%. The boost converter 500, on the other hand, reduces conduction losses associated with the boost diode 310 shown in FIG. 3. In the illustrated embodiment, first and second boost switches S1, S2 are coupled to the diode block 510 that includes a plurality of diodes D7–D12 instead of the DC voltage rails as previously illustrated.

In the above described boost converters, the Y-connected input capacitors Ca, Cb, Cc have one common "floating" terminal that moves about a neutral potential. This common floating potential has an advantage that the input current THD can be further reduced. As illustrated in FIGS. 2 and 4, the current in a boost inductor with a higher corresponding phase voltage has a higher peak value and is discharged slower when compared to a current in a boost inductor with a lower corresponding phase voltage. These differences result in having an undesired extra low frequency current present at the phase with the highest amplitude of phase-to-neutral voltage. This extra low frequency current, however, flows into, or out of, the common floating terminal of the Y-connected capacitors Ca, Cb, Cc and changes the voltages across the capacitors Ca, Cb, Cc such that the above-mentioned low frequency current is reduced (a negative feedback effect). As opposed to tying the common terminal of the Y-connected capacitors Ca, Cb, Cc to a neutral terminal, e.g., of the voltage source 110 illustrated in FIG. 1, leaving the common terminal floating ultimately results in lower input current THD. It should be noted, however, that the present invention does not require that the common terminal be left floating. Those skilled in the art should readily appreciate that the common terminal may be tied to neutral, if available.

While specific embodiments of a boost power converter have been illustrated and described, other embodiments are well within the broad scope of the present invention. For a better understanding of switching power converters, in general, see "Principles of Power Electronics" by John G. Kassakian, et al., Addison Wesley, Inc. (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. A boost converter having first, second and third phase inputs and an output, comprising:
   first, second and third inductors coupled to said first, second and third phase inputs, respectively, and operable in a discontinuous conduction mode (DCM);
   first and second switches coupled between corresponding rails of said output; and
   first, second and third capacitors coupled between said first, second and third phase inputs, respectively, and a node between said first and second switches, said first and second switches cooperating progressively to employ a voltage across said rails less a voltage across said first, second and third capacitors to discharge currents through said first, second and third inductors, respectively, and thereby reduce input current total harmonic distortion (THD) on all three of said phase inputs.

2. The boost converter as recited in claim 1 wherein a common terminal of said first, second and third capacitors are coupled to said node.

3. The boost converter as recited in claim 2 wherein a common terminal of said first, second and third capacitors are coupled to a neutral potential.

4. The boost converter as recited in claim 1 further comprising a rectifier interposed between said first, second and third inductors and said first and second switches.

5. The boost converter as recited in claim 1 further comprising an output capacitor coupled across said first and second switches.

6. The boost converter as recited in claim 1 wherein said first and second switches each conduct for a duty cycle of about 50%.

7. The boost converter as recited in claim 1 further comprising a diode coupled to said output.

8. The boost converter as recited in claim 1 further comprising a plurality of diodes interposed between said first, second and third inductors and said first and second switches.

9. The boost converter as recited in claim 1 further comprising an electromagnetic interference (EMI) filter coupled to said first, second and third phase inputs.

10. The boost converter as recited in claim 1 further comprising a regulation circuit that controls said first and second switches.

11. A method of operating a boost converter having first, second and third phase inputs and an output, comprising:
    operating first, second and third inductors coupled to said first, second and third phase inputs, respectively, in a discontinuous conduction mode (DCM);
    coupling first and second switches between corresponding rails of said output;
    coupling first, second and third capacitors between said first, second and third phase inputs, respectively, and a node between first and second switches; and
    controlling said first and second switches progressively to employ a voltage across said rails less a voltage across said first, second and third capacitors to discharge currents through said first, second and third inductors, respectively, and thereby reduce input current total harmonic distortion (THD) on all three of said phase inputs.

12. The method as recited in claim 11 further comprising coupling a common terminal of said first, second and third capacitors together.

13. The boost converter as recited in claim 12 further comprising coupling said common terminal of said first, second and third capacitors to a neutral potential.

14. The method as recited in claim 11 further comprising rectifying a voltage from said first, second and third inductors.

15. The method as recited in claim 11 further comprising filtering an output voltage.

16. The method as recited in claim 11 further comprising inducing said first and second switches to conduct for a duty cycle of about 50%.

17. The method as recited in claim 11 further comprising extending a duty cycle of at least one of said first and second switches.

18. The method as recited in claim 17 wherein the act of extending is performed by one of:
    a plurality of diodes interposed between said first, second and third inductors and said first and second switches, and
    a diode coupled to said output.

19. The method as recited in claim 11 further comprising filtering electromagnetic interference (EMI) at said first, second and third phase inputs.

20. The method as recited in claim 11 wherein the act of controlling is performed by a regulation circuit.

* * * * *